Patented Sept. 16, 1941

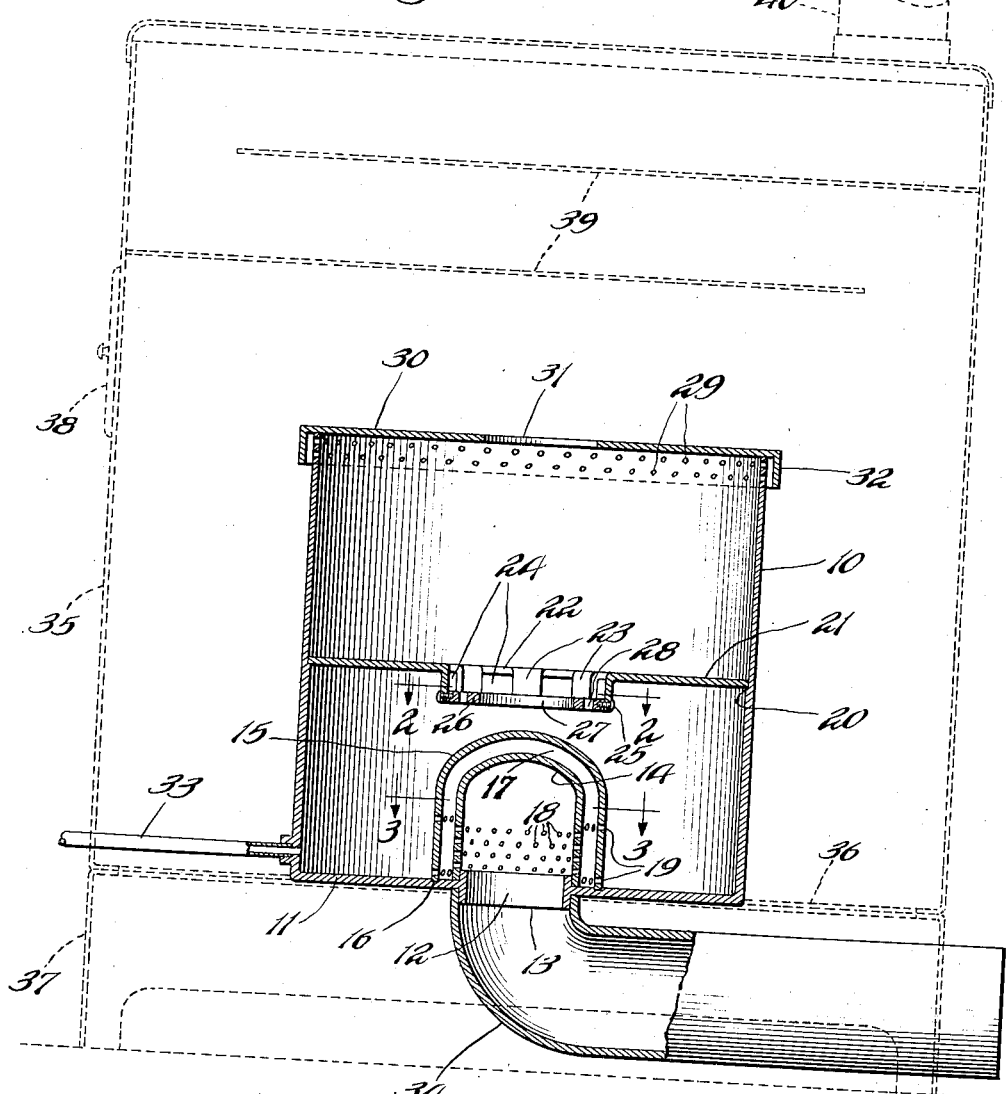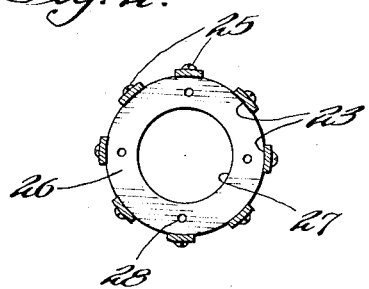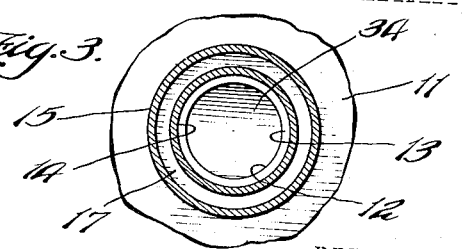

2,256,183

UNITED STATES PATENT OFFICE 2,256,183

BURNER

John Wojcicki, Chicago, Ill., assignor of one-half to Julius Bandyga, Chicago, Ill.

Application June 5, 1940, Serial No. 338,833

3 Claims. (Cl. 158—91)

The present invention relates to burners and has for its object the provision of a device wherein fluid fuel such as gas or oil may be completely consumed so as to leave practically no soot or smoke.

A still further object of the present invention is the provision of a burner which may receive a supply of air which is preheated prior to entering the burner, and in which combustion chamber and a supplementary combustion chamber may be provided.

A still further object of the present invention is to generally improve the construction of burners of the type indicated.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views;

Fig. 1 is a vertical cross-sectional view through the burner;

Fig. 2 is a cross-sectional view on horizontal plane on line 2—2 of Fig. 1; and

Fig. 3 is a horizontal cross-sectional view on line 3—3 of Fig. 1.

Referring to the present drawing in detail there is shown therein a cylindrical casing 10 having a bottom 11. Centrally of said bottom a round opening 12 is provided which is defined by collar 13 integrally formed with said bottom 11, and which collar projects above and below said bottom 11. Set over said opening 12 is cap 14, which, by its lower end is adapted to frictionally engage and contact the outer periphery of the upper end of said collar 13, by virtue of which arrangement said cap 14 remains in a rigid engagement with said bottom 11. Cap 15 of larger dimensions than cap 14 is positioned over the latter, and by its lower end is set within an annular groove 16 made in bottom 11, whereby said cap 15 likewise remains in a rigid relation with bottom 11. Said cap 14 is in a concentric and spaced relation with cap 15 so as to provide therebetween a preheating chamber 17 for the purpose hereinafter described.

Cap 14 adjacent its lower end is provided with a plurality of circumferential rows of apertures 18, which are disposed above the upper termination of collar 13. Cap 15 is provided with a pair of circumferential rows of apertures 19. These latter apertures 19 are made at points which are below and above apertures 18 in cap 14 on horizontal plane. In other words apertures 18 are not in alignment on horizontal plane with apertures 19. This arrangement is made for the purpose of causing the air passing through apertures 18 to first strike the opposite solid surface of cap 15 so that the same may circulate within preheating chamber 17 before the same finally passes into the burner through apertures 19.

Substantially the upper one-half portion of cylindrical casing 10 is reduced in thickness so as to define on the inner periphery thereof shoulder 20 upon which an annular baffle plate 21 may be positioned. Said baffle plate 21 has a round opening 22 in its center of a diameter substantially corresponding to diameter of cap 15 and is disposed above said cap 15. Integrally formed with said baffle plate 21 and downwardly projecting from the marginal edge defined by said opening 22 is a plurality of spaced plates 23 which are of arcuate formation on horizontal plane. Spaces defined by said plates 23 provide a plurality of alternate openings 24. The lower ends of said plates 23 are adapted to receive and support by means of engaging screws 25 a ring plate 26 having a central opening 27 and a plurality of apertures 28 made in its body. Said opening 27 is of a diameter considerably smaller than the diameter of cap 15.

Adjacent the upper end of cylindrical casing 10 a plurality of rows of apertures 29 are made. Closure 30 having a central round opening 31, is set over the upper end of cylindrical casing 10. Said closure 30 is of greater diameter than the diameter of cylindrical casing 10 and is provided at its outer marginal edge with a downwardly depending skirt 32 which is on a horizontal path of said apertures 29.

Pipe 33 connected with the lower end of cylindrical casing 10 forms means for supplying fuel into said casing.

The lower end of said cylindrical casing 10 which is below baffle plate 21 defines the combustion chamber. If liquid fuel, such as oil is used, the same flowing from pipe 33 will spill upon bottom 11 where it will burn. Air passing through opening 12 defined by said collar 13 will first enter cap 14 and through apertures 18 into chamber 17 where it will become preheated. Thereupon air from said preheating chamber 17 will pass through apertures 19 into the combustion chamber within cylindrical casing 10 disposed below baffle plate 21, in which chamber the fuel will be more or less thoroughly consumed. The combustion gases, having a tendency to rise, will first strike baffle plate 21 which will retard their flow for facilitating more thorough combustion. Eventually said combustion gases will flow horizontally and will escape through openings 24 above said baffle plate 21, the space within said cylindrical casing 10 above said baffle plate 21 defining a supplementary combustion chamber.

Gases which rise in the immediate vicinity of cap 15 on rising upwardly will strike ring plate 26, an amount of them passing through apertures 28 and a larger amount deflected laterally into opening 27 and openings 24.

All gases eventually will pass into the supplementary combustion chamber disposed above baffle plate 21 and within the upper end of cylindrical casing 10 to be therein further consumed. To facilitate their combustion a supply of air will constantly pass through apertures 29. To retard too fast flow of air through said apertures 29 skirt 32 acts as a retarding means. Finally the resulting combustion gases will pass through opening 31 in closure 30 to the outside of the burner.

To prevent spilling of fuel beneath the burner particularly when an overflow of fuel should occur so that the same would flow through the lowermost apertures 19 and 18, pipe 34 may be provided to frictionally engage by its vertical end collar 13. The horizontal portion of said pipe 34 will carry the overflown fuel beyond the immediate confines of the burner.

Burner such as herein shown and described is intended to be positioned within a stove 35 shown by dotted lines, which has bottom 36 upon which the burner may be positioned. The stove may be further provided with supporting legs 37, door 38, a plurality of baffle plates 39 placed in a staggered relative position, and a flue 40.

While there is described herein a preferred embodiment of the present invention, it is nevertheless to be understood that minor changes may be made therein without departing from the spirit and scope of the invention as claimed.

What I claim as new is:

1. A burner comprising a casing, said casing constituting a combustion chamber, the bottom of said casing being provided with an opening, a collar integrally formed with the bottom of said casing and on the marginal edge of said opening, an inverted cup-shaped shell positioned over said opening and in frictional engagement with said collar, and a like larger outer shell in concentric relation with the first shell and in engagement with said bottom, each of said shells being provided with a plurality of perforations, the perforations in the two shells being on different horizontal planes, the two shells constituting an air preheating chamber, and means for admitting fuel to the combustion chamber externally of the shells.

2. A burner comprising a casing including a bottom tray adapted to receive a liquid fuel, said tray being provided with an opening, a pair of perforated shells overlying said opening, each of said shells including a cylindrical upright portion and a dome portion, said shells being in a concentric spaced relative position for defining an air preheating chamber and having the lower edges thereof sealed to the bottom of the tray, the perforations in the two shells being at the cylindrical portions thereof and adjacent the lower ends thereof and on different horizontal planes in the two shells, and means for admitting fuel to the tray externally of the shells.

3. A burner comprising a casing, said casing constituting a combustion chamber, the bottom of said casing being provided with an opening, a collar integrally formed with the bottom of said casing and on the marginal edge of said opening, an inverted cup-shaped shell positioned over said opening and in frictional engagement with said collar and a like larger outer shell in concentric relation with said first named shell, said bottom being provided with a circular groove surrounding said collar within which the lower end of said larger outer shell is positioned for the purpose of engaging said bottom, each of said shells being provided with a plurality of perforations, the perforations in the two shells being on different horizontal planes, the two shells constituting an air preheating chamber within which the air passing through said opening being adapted to circulate before flowing into said combustion chamber through perforations in said outer shell, and means for admitting fuel to the combustion chamber externally of the shells.

JOHN WOJCICKI.